(12) United States Patent
Harris

(10) Patent No.: US 11,382,410 B2
(45) Date of Patent: Jul. 12, 2022

(54) DISPENSING TOOTHBRUSH ASSEMBLY

(71) Applicant: Vanness Harris, North Hollywood, CA (US)

(72) Inventor: Vanness Harris, North Hollywood, CA (US)

( * ) Notice: Subject to any disclaimer, the term of this patent is extended or adjusted under 35 U.S.C. 154(b) by 395 days.

(21) Appl. No.: 16/596,306

(22) Filed: Oct. 8, 2019

(65) Prior Publication Data
US 2021/0100349 A1    Apr. 8, 2021

(51) Int. Cl.
*A46B 11/00* (2006.01)
*A46B 15/00* (2006.01)
*A61C 15/02* (2006.01)
*A61C 15/04* (2006.01)

(52) U.S. Cl.
CPC ...... *A46B 11/0041* (2013.01); *A46B 11/0065* (2013.01); *A46B 15/0091* (2013.01); *A61C 15/02* (2013.01); *A61C 15/043* (2013.01); *A46B 11/002* (2013.01); *A46B 15/0069* (2013.01); *A46B 15/0071* (2013.01); *A46B 2200/1066* (2013.01)

(58) Field of Classification Search
CPC ............ A46B 11/0041; A46B 11/0065; A46B 15/0091; A46B 2200/1066; A46B 11/00; A46B 11/001; A46B 11/002; A46B 11/0055; A46B 11/0072; A46B 15/0055; A46B 15/0061; A46B 15/0069; A46B 15/0071; A46B 15/0073; A61C 15/02; A61C 15/043; A61C 15/04; A61C 15/046
USPC ................ 401/195, 270, 282, 152, 158, 156
See application file for complete search history.

(56) References Cited

U.S. PATENT DOCUMENTS

| | | | |
|---|---|---|---|
| 4,949,156 A | 4/1990 | Gipson | |
| 6,179,503 B1 * | 1/2001 | Taghavi-Khanghah | A46B 11/0058 401/184 |
| 6,719,471 B1 * | 4/2004 | Giro | A46B 11/0055 401/187 |
| 6,729,789 B2 | 5/2004 | Gordon | |
| 7,198,051 B1 | 4/2007 | Festa | |
| D580,175 S | 11/2008 | Quaries | |
| 2004/0237995 A1 | 12/2004 | Mualem | |
| 2005/0147461 A1 * | 7/2005 | Glover | A46B 15/0071 401/279 |

(Continued)

FOREIGN PATENT DOCUMENTS

WO    WO03103985    12/2003
WO    WO2007056361    5/2007

*Primary Examiner* — David J Walczak

(57) ABSTRACT

A dispensing toothbrush assembly includes a handle that has a toothpaste well integrated therein. A toothpaste tube is insertable into the toothpaste well in the handle and the toothpaste tube contains a toothpaste. A brush head is removably attachable to the handle and the brush head is in fluid communication with the toothpaste tube when the brush head is removably attached to the handle. The brush head has a conduit integrated therein for receiving the toothpaste contained in the toothpaste tube. A pump is movably coupled to the handle and the pump compresses the toothpaste tube when the pump is manipulated for urging the toothpaste outwardly from the toothpaste tube and into the conduit. A spool of dental floss is removably attachable to the handle for dispensing dental floss outwardly therefrom. A pick is coupled to and extends away from the spool of dental floss.

13 Claims, 5 Drawing Sheets

(56) References Cited

U.S. PATENT DOCUMENTS

2006/0210352 A1 9/2006 Clark
2009/0119859 A1 5/2009 Podolsky
2010/0132145 A1 6/2010 Minto

* cited by examiner

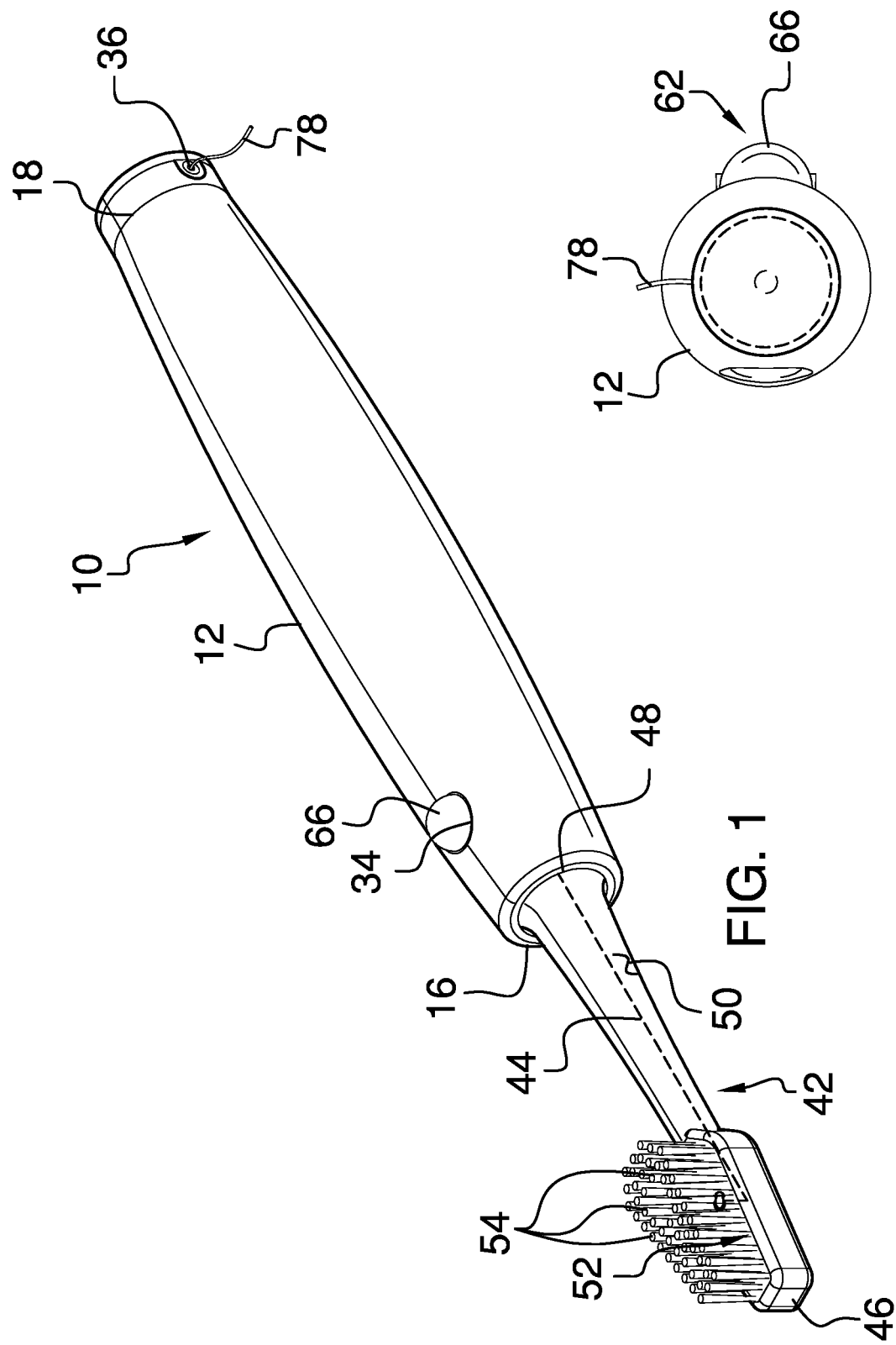

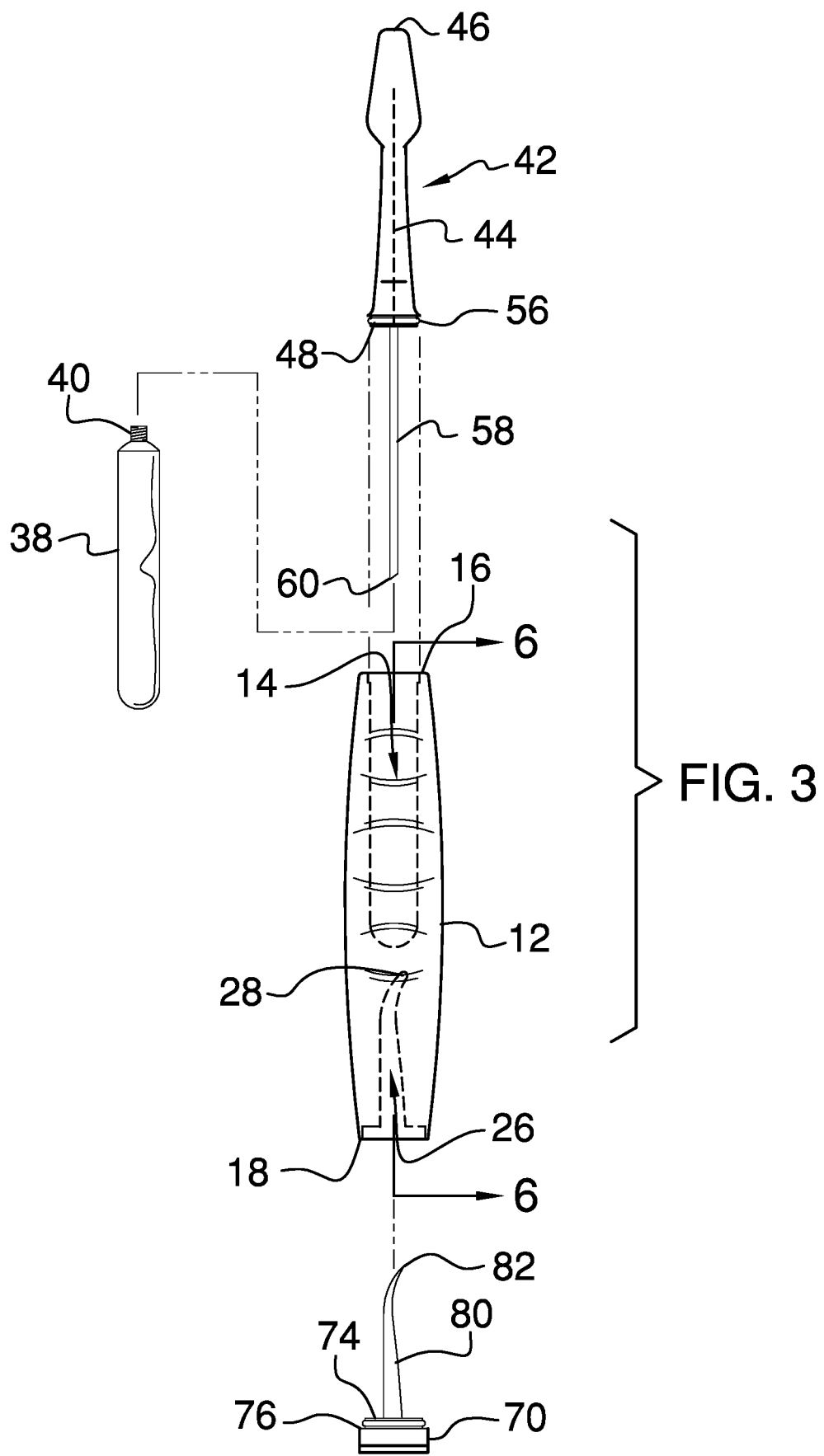

DISPENSING TOOTHBRUSH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to toothbrush devices and more particularly pertains to a new toothbrush device for storing and dispensing a measured amount of toothpaste.

(2) Description of Related Art Including Information Disclosed Under 37 CFR 1.97 and 1.98

The prior art relates to toothbrush devices.

BRIEF SUMMARY OF THE INVENTION

An embodiment of the disclosure meets the needs presented above by generally comprising a handle that has a toothpaste well integrated therein. A toothpaste tube is insertable into the toothpaste well in the handle and the toothpaste tube contains a toothpaste. A brush head is removably attachable to the handle and the brush head is in fluid communication with the toothpaste tube when the brush head is removably attached to the handle. The brush head has a conduit integrated therein for receiving the toothpaste contained in the toothpaste tube. A pump is movably coupled to the handle and the pump compresses the toothpaste tube when the pump is manipulated for urging the toothpaste outwardly from the toothpaste tube and into the conduit. A spool of dental floss is removably attachable to the handle for dispensing dental floss outwardly therefrom. A pick is coupled to and extends away from the spool of dental floss.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a perspective view of a dispensing toothbrush assembly according to an embodiment of the disclosure.

FIG. 2 is a bottom phantom view of an embodiment of the disclosure.

FIG. 3 is an exploded perspective view of an embodiment of the disclosure.

DETAILED DESCRIPTION OF THE INVENTION

Figure 4:
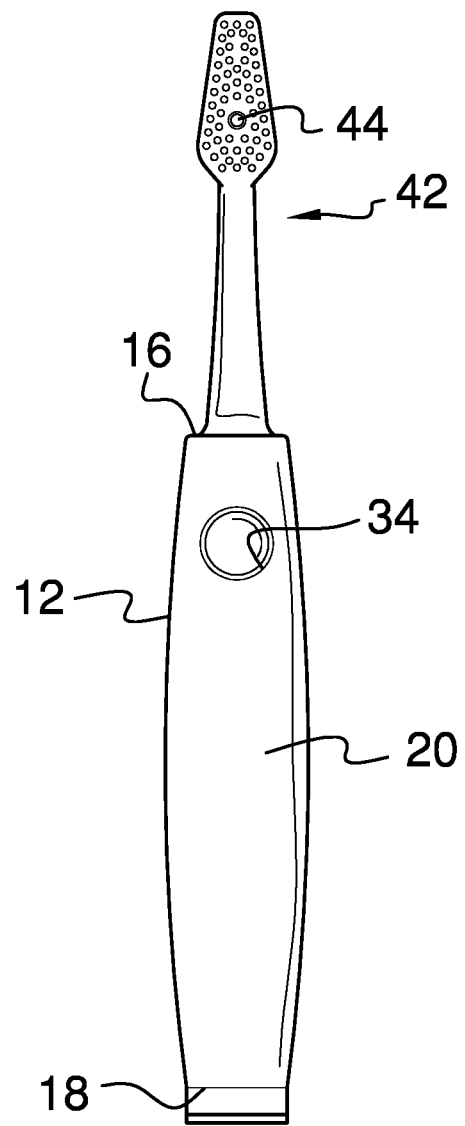
FIG. 4 is a front view of an embodiment of the disclosure.
Figure 5:
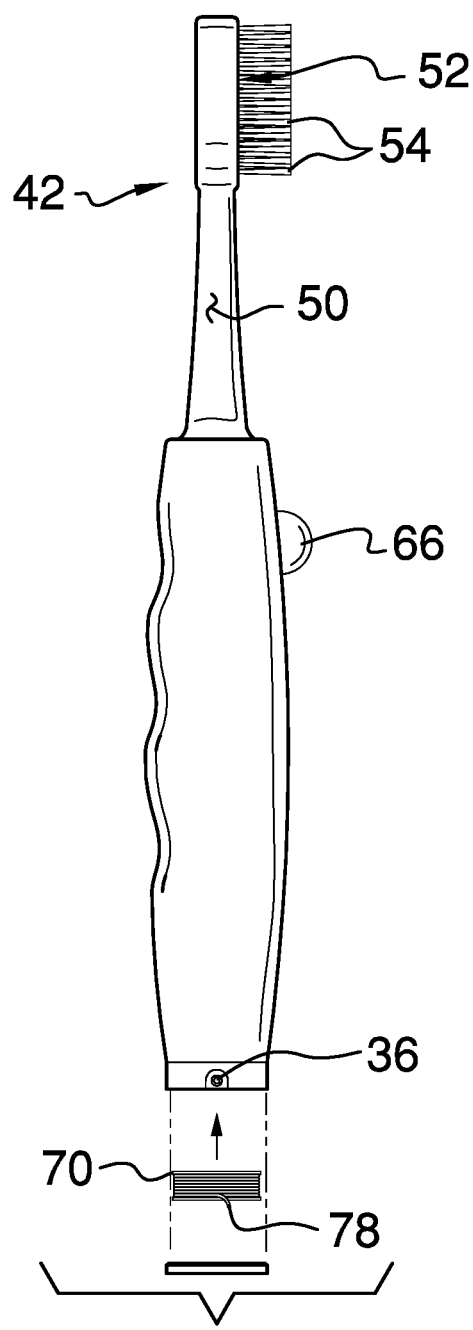
FIG. 5 is a right side view of an embodiment of the disclosure.
Figure 6:
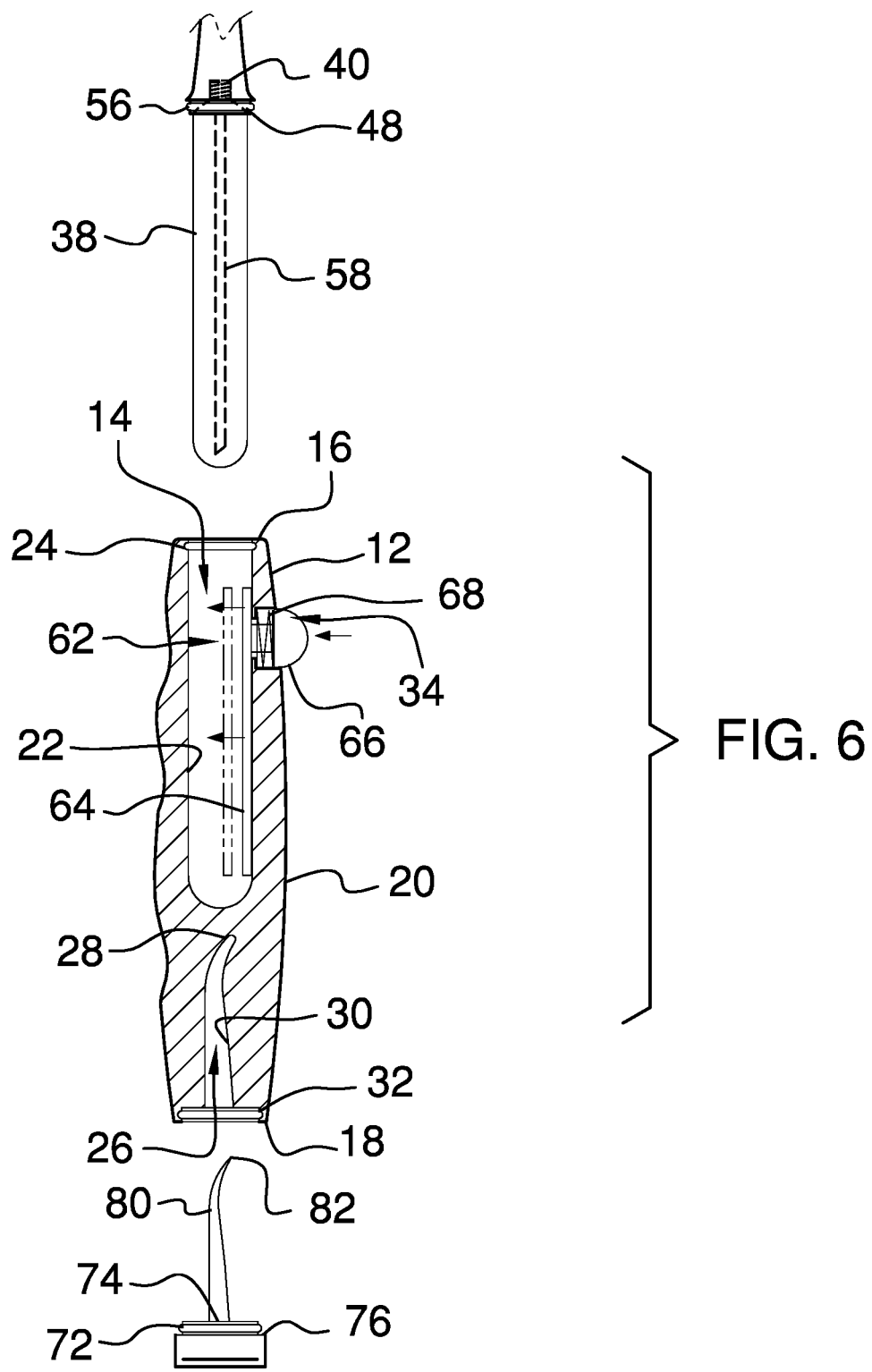
FIG. 6 is a cross sectional view taken along line 6-6 of FIG. 3 of an embodiment of the disclosure.

With reference now to the drawings, and in particular to FIGS. 1 through 6 thereof, a new toothbrush device embodying the principles and concepts of an embodiment of the disclosure and generally designated by the reference numeral 10 will be described.

As best illustrated in FIGS. 1 through 6, the dispensing toothbrush assembly 10 generally comprises a handle 12 that has a toothpaste well 14 integrated therein. The handle 12 has a first end 16, a second end 18 and an outer wall 20 extending therebetween, and the toothpaste well 14 extends inwardly on the first end 16 toward the second end 18. The toothpaste well 14 has a bounding surface 22 and the bounding surface 22 has an engagement 24 extending around an entire circumference of the toothpaste well 14. Additionally, the engagement 24 is spaced from the first end 16 of the handle 12.

The second end 18 has a pick well 26 extending inwardly therein toward the first end 16 and the pick well 26 has a terminal end 28. The pick well 26 curves between the second end 18 and the terminal end 28. The pick well 26 has a bounding surface 30 and the bounding surface 30 of the pick well 26 has an engagement 32 extending around an entire perimeter of the pick well 26. The outer wall 20 has a button opening 34 extending into the toothpaste well 14 and the handle 12 has a floss opening 36 extending into the pick well 26.

A toothpaste tube 38 is provided and the toothpaste tube 38 is insertable into the toothpaste well 14 in the handle 12. The toothpaste tube 38 contains a toothpaste for brushing a person's teeth. The toothpaste tube 38 has a top end 40, the top end 40 is open and the top end 40 is aligned with the first end 16 of the handle 12 when the toothpaste tube 38 is inserted into the toothpaste well 14. Additionally, the toothpaste tube 38 is comprised of a deformable material.

A brush head 42 is removably attachable to the handle 12. The brush head 42 is in fluid communication with the toothpaste tube 38 when the brush head 42 is removably attached to the handle 12. The brush head 42 has a conduit 44 integrated therein for receiving the toothpaste contained in the toothpaste tube 38. In this way the toothpaste can be applied to the brush head 42 for brushing teeth.

The brush head 42 has an upper end 46, a lower end 48 and an outer surface 50 extending therebetween. The outer surface 50 has a flattened portion 52 extending from the upper end 46 toward the lower end 48. The conduit 44 extends between the lower end 48 and the flattened portion 52 of the outer surface 50. A plurality of bristles 54 is attached to the brush head 42. Each of the bristles 54 is positioned on the flattened portion 52 of the outer surface 50 to receive the toothpaste from the conduit 44.

The outer surface 50 has a ridge 56 extending outwardly therefrom, the ridge 56 extends around an entire circumference of the brush head 42 and the ridge 56 is aligned with the lower end 48. The ridge 56 releasably engages the engagement 24 in the bounding surface 22 of the toothpaste well 14 when the brush head 42 is attached to the handle 12. A tube 58 is coupled to and extends downwardly from the lower end 48 of the brush head 42 and the tube 58 is in fluid communication with the conduit 44. The tube 58 has a distal end 60 with respect to the lower end 48 of the brush head 42 and the distal end 60 tapers to a point. Moreover, the distal end 60 of the tube 58 extends into the top end 40 of the toothpaste tube 38 when the brush head 42 is attached to the handle 12 and the toothpaste tube 38 is positioned in the toothpaste well 14.

A pump 62 is movably coupled to the handle 12 and the pump 62 engages the toothpaste tube 38. The pump 62 compresses the toothpaste tube 38 when the pump 62 is manipulated for urging the toothpaste outwardly from the toothpaste tube 38 and into the conduit 44. The pump 62 comprises a member 64 that is positioned in the toothpaste well 14. The member 64 is oriented to extend along a line extending through the first end 16 and the second end 18 of the handle 12.

The pump 62 includes a button 66 that is coupled to the member 64 and the button 66 extends outwardly through the button opening 34 in the outer wall 20 of the handle 12. The member 64 is compressed against the toothpaste tube 38 when the button 66 is depressed. A biasing member 68, such as a spring or the like, is positioned between the button 66 and the outer wall 20 of the handle 12 to bias the button 66 outwardly in the button opening 34.

A spool of dental floss 70 is removably attachable to the handle 12 for dispensing dental floss 78 outwardly therefrom. The spool of dental floss 70 has an outer surface 72 and a top surface 74, and the outer surface 72 of the spool of dental floss 70 has a ridge 76 extending outwardly therefrom. The ridge 76 on the outer surface 72 of the spool of dental floss 70 releasably engages the engagement 32 on the bounding surface 30 of the pick well 26 for retaining the spool of dental floss 70 in the pick well 26. The dental floss 78 contained in the spool of dental floss 70 extends outwardly through the floss opening 36 in the outer wall 20 of the handle 12.

A pick 80 is coupled to and extends away from the spool of dental floss 70. The pick well 26 insertably receives the pick 80 when the spool of dental floss 70 is attached to the handle 12 for storage. The pick 80 is positioned on the top surface 74 of the spool of dental floss 70 and the pick 80 has a distal end 82 with respect to the top surface 74. The pick 80 is curved between the top surface 74 and the distal end 82 of the pick 80.

In use, the toothpaste tube 38 is inserted into the toothpaste well 14 and the brush head 42 is attached to the handle 12. The button 66 is depressed to urge a measured amount of the toothpaste contained in the toothpaste tube 38 outwardly onto the bristles 54 on the brush head 42. In this way the brush head 42 is prepared for brushing teeth. A measured length of dental floss 70 can be drawn outwardly from the spool of dental floss 70 for flossing teeth. Additionally, the spool of dental floss 70 can be removed from the handle 12 to facilitate the pick 80 to be manipulated for removing particles from the person's teeth.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A dispensing toothbrush assembly being configured to release toothpaste onto bristles for brushing teeth, said assembly comprising:

a handle having a toothpaste well being integrated therein;

a toothpaste tube being insertable into said toothpaste well in said handle, said toothpaste tube containing a toothpaste;

a brush head being removably attachable to said handle, said brush head being in fluid communication with said toothpaste tube when said brush head is removably attached to said handle, said brush head having a conduit being integrated therein for receiving the toothpaste contained in said toothpaste tube;

a pump being movably coupled to said handle, said pump engaging said toothpaste tube, said pump compressing said toothpaste tube when said pump is manipulated for urging the toothpaste outwardly from said toothpaste tube and into said conduit;

a spool of dental floss being removably attachable to said handle for dispensing dental floss outwardly therefrom;

a pick being coupled to and extending away from said spool of dental floss;

wherein said handle has a first end, a second end and an outer wall extending therebetween, said toothpaste well extending inwardly on said first end toward said second end, said toothpaste well having a bounding surface, said bounding surface having an engagement extending around an entire circumference of said toothpaste well, said engagement being spaced from said first end of said handle; and wherein said second end has a pick well extending inwardly therein toward said first end, said pick well having a terminal end, said pick well curving between said second end and said terminal end.

2. The assembly according to claim 1, wherein said outer wall has a button opening extending into said toothpaste well.

3. The assembly according to claim 2, wherein said handle has a floss opening extending into said pick well, said pick well having a bounding surface, said bounding surface of said pick well having an engagement extending around an entire perimeter of said pick well.

4. The assembly according to claim 3, wherein said spool of dental floss has an outer surface and a top surface, said outer surface of said spool of dental floss having a ridge extending outwardly therefrom, said ridge on said outer surface of said spool of dental floss releasably engaging said engagement on said bounding surface of said pick well for retaining said spool of dental floss in said pick well, said dental floss extending outwardly through said floss opening in said outer wall of said handle.

5. The assembly according to claim 4, wherein said pick well insertably receives said pick when said spool of dental floss is attached to said handle for storage, said pick being positioned on said top surface of said spool of dental floss, said pick having a distal end with respect to said top surface, said pick being curved between said top surface and said distal end of said pick.

6. The assembly according to claim 2, wherein said toothpaste tube has a top end, said top end being open, said top end being aligned with said first end of said handle when said toothpaste tube is inserted into said toothpaste well, said toothpaste tube being comprised of a deformable material.

7. The assembly according to claim 6, wherein said brush head has an upper end, a lower end and an outer surface extending therebetween, said outer surface having a flattened portion extending from said upper end toward said lower end, said conduit extending between said lower end and said flattened portion of said outer surface, said brush head having a plurality of bristles being attached thereto, each of said bristles being positioned on said flattened portion of said outer surface wherein said bristles are configured to receive the toothpaste from said conduit.

8. The assembly according to claim 7, wherein said outer surface has a ridge extending outwardly therefrom, said ridge extending around an entire circumference of said brush head, said ridge being aligned with said lower end, said ridge releasably engaging said engagement in said bounding surface of said toothpaste well when said brush head is attached to said handle.

9. The assembly according to claim 8, further comprising a tube being coupled to and extending downwardly from said lower end of said brush head, said tube being in fluid communication with said conduit, said tube having a distal end with respect to said lower end of said brush head, said distal end tapering to a point, said distal end of said tube extending into said top end of said toothpaste tube when said brush head is attached to said handle and said toothpaste tube is positioned in said toothpaste well.

10. The assembly according to claim 6, wherein said pump comprises a member being positioned in said toothpaste well, said member being oriented to extend along a line extending through said first end and said second end of said handle.

11. The assembly according to claim 10, wherein said pump includes a button being coupled to said member, said button extending outwardly through said button opening in said outer wall of said handle wherein said button is configured to be depressed, said member being compressed against said toothpaste tube when said button is depressed.

12. The assembly according to claim 11, wherein said pump includes a biasing member being positioned between said button and said outer wall of said handle, said biasing member biasing said button outwardly in said button opening.

13. A dispensing toothbrush assembly being configured to release toothpaste onto bristles for brushing teeth, said assembly comprising:

a handle having a toothpaste well being integrated therein, said handle having a first end, a second end and an outer wall extending therebetween, said toothpaste well extending inwardly on said first end toward said second end, said toothpaste well having a bounding surface, said bounding surface having an engagement extending around an entire circumference of said toothpaste well, said engagement being spaced from said first end of said handle, said second end having a pick well extending inwardly therein toward said first end, said pick well having a terminal end, said pick well curving between said second end and said terminal end, said outer wall having a button opening extending into said toothpaste well, said handle having a floss opening extending into said pick well, said pick well having a bounding surface, said bounding surface of said pick well having an engagement extending around an entire perimeter of said pick well;

a toothpaste tube being insertable into said toothpaste well in said handle, said toothpaste tube containing a toothpaste, said toothpaste tube having a top end, said top end being open, said top end being aligned with said first end of said handle when said toothpaste tube is inserted into said toothpaste well, said toothpaste tube being comprised of a deformable material;

a brush head being removably attachable to said handle, said brush head being in fluid communication with said toothpaste tube when said brush head is removably attached to said handle, said brush head having a conduit being integrated therein for receiving the toothpaste contained in said toothpaste tube, said brush head having an upper end, a lower end and an outer surface extending therebetween, said outer surface having a flattened portion extending from said upper end toward said lower end, said conduit extending between said lower end and said flattened portion of said outer surface, said brush head having a plurality of bristles being attached thereto, each of said bristles being positioned on said flattened portion of said outer surface wherein said bristles are configured to receive the toothpaste from said conduit, said outer surface having a ridge extending outwardly therefrom, said ridge extending around an entire circumference of said brush head, said ridge being aligned with said lower end, said ridge releasably engaging said engagement in said bounding surface of said toothpaste well when said brush head is attached to said handle;

a tube being coupled to and extending downwardly from said lower end of said brush head, said tube being in fluid communication with said conduit, said tube having a distal end with respect to said lower end of said brush head, said distal end tapering to a point, said distal end of said tube extending into said top end of said toothpaste tube when said brush head is attached to said handle and said toothpaste tube is positioned in said toothpaste well;

a pump being movably coupled to said handle, said pump engaging said toothpaste tube, said pump compressing said toothpaste tube when said pump is manipulated for urging the toothpaste outwardly from said toothpaste tube and into said conduit, said pump comprising:
- a member being positioned in said toothpaste well, said member being oriented to extend along a line extending through said first end and said second end of said handle;
- a button being coupled to said member, said button extending outwardly through said button opening in said outer wall of said handle wherein said button is configured to be depressed, said member being compressed against said toothpaste tube when said button is depressed; and
- a biasing member being positioned between said button and said outer wall of said handle, said biasing member biasing said button outwardly in said button opening;

a spool of dental floss being removably attachable to said handle for dispensing dental floss outwardly therefrom, said spool of dental floss having an outer surface and a top surface, said outer surface of said spool of dental floss having a ridge extending outwardly therefrom, said ridge on said outer surface of said spool of dental floss releasably engaging said engagement on said bounding surface of said pick well for retaining said spool of dental floss in said pick well, said dental floss extending outwardly through said floss opening in said outer wall of said handle; and a pick being coupled to and extending away from said spool of dental floss, said pick well insertably receiving said pick when said spool of dental floss is attached to said handle for storage, said pick being positioned on said top surface of said spool of dental floss, said pick having a distal end with respect to said top surface, said pick being curved between said top surface and said distal end of said pick.

\* \* \* \* \*